US011530670B2

(12) United States Patent
Sudou et al.

(10) Patent No.: US 11,530,670 B2
(45) Date of Patent: Dec. 20, 2022

(54) AIR CLEANER

(71) Applicants: DENSO CORPORATION, Kariya (JP); TOYOTA JIDOSHA KABUSHIKI KAISHA, Toyota (JP)

(72) Inventors: Akiyuki Sudou, Kariya (JP); Toshio Hayashi, Kariya (JP); Shunsuke Rikitake, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 531 days.

(21) Appl. No.: 16/695,764

(22) Filed: Nov. 26, 2019

(65) Prior Publication Data

US 2020/0173402 A1 Jun. 4, 2020

(30) Foreign Application Priority Data

Nov. 29, 2018 (JP) ............................ JP2018-223229

(51) Int. Cl.

| | |
|---|---|
| ***B01D 46/00*** | (2022.01) |
| ***F02M 35/02*** | (2006.01) |
| ***F02M 35/024*** | (2006.01) |
| ***F02M 35/10*** | (2006.01) |

(52) U.S. Cl.
CPC .... *F02M 35/0202* (2013.01); *F02M 35/0205* (2013.01); *F02M 35/02416* (2013.01)

(58) Field of Classification Search
CPC ............... B01D 46/00; F02M 35/0202; F02M 35/0205; F02M 35/02416; F02M 35/10386
USPC .............. 55/432, 482, 406, 385.3, 497, 413; 96/417
See application file for complete search history.

(56) References Cited

U.S. PATENT DOCUMENTS 5,029,465 A 7/1991 Tanimura et al.
6,199,434 B1 * 3/2001 Cornil ..................... G01F 15/04 73/861.83
6,619,114 B1 9/2003 Lenzing et al.
7,377,954 B2 * 5/2008 Gunderson ........ B01D 46/0045 55/497
8,696,777 B1 * 4/2014 Patil ........................ F01N 13/10 96/417
2001/0013274 A1 8/2001 Oda
2002/0104375 A1 8/2002 Renninger et al.
2003/0167741 A1 * 9/2003 Illingworth ............... A47L 9/08 55/406
2004/0139709 A1 * 7/2004 Illingworth ............... A47L 5/24 55/406

(Continued)

FOREIGN PATENT DOCUMENTS

EP 0 859 145 5/2001
JP 4-114411 10/1992

(Continued)

*Primary Examiner* — Minh Chau T Pham
(74) *Attorney, Agent, or Firm* — Nixon & Vanderhye P.C.

(57) ABSTRACT

An air cleaner has a body, an intake part to take air into the body, an exhaust pipe to exhaust the air from the body, a mounting section to mount an air flow meter to the exhaust pipe, a rib disposed on an inner surface of the body, and a straightening element disposed on an inner surface of the exhaust pipe. The rib extends toward the exhaust pipe and the straightening element extends in a same direction where the rib extends. The straightening element is located closer to the body than the mounting section.

10 Claims, 4 Drawing Sheets

(56) References Cited

U.S. PATENT DOCUMENTS

| | | | | |
|---|---|---|---|---|
| 2009/0142234 | A1* | 6/2009 | Tatarchuk .............. | B01D 46/58<br>55/482 |
| 2011/0078987 | A1* | 4/2011 | Shishov ................. | B01D 46/14<br>55/432 |
| 2012/0017764 | A1* | 1/2012 | Lee .................... | F02M 35/0201<br>55/385.3 |
| 2015/0152818 | A1* | 6/2015 | Fischer .............. | F02M 35/0201<br>55/385.3 |
| 2016/0059171 | A1* | 3/2016 | Lukasavitz ............. | G01F 15/00<br>55/413 |

FOREIGN PATENT DOCUMENTS

| | | |
|---|---|---|
| JP | 10-288102 | 10/1998 |
| JP | 2014-156854 | 8/2014 |

* cited by examiner

AIR CLEANER

CROSS REFERENCE TO RELATED APPLICATION

This application is based on Japanese Patent Application No. 2018-223229 filed on Nov. 29, 2018, the disclosure of which is incorporated herein by reference in its entirety.

TECHNICAL FIELD

The present disclosure is related to an air cleaner for a vehicle.

BACKGROUND

An air cleaner has a rib to ensure rigidity. A pressure loss is reduced or suppressed by optimizing a shape of the rib.

SUMMARY

According to an aspect of the present disclosure, an air cleaner is provided. The air cleaner has a body, an intake part, an exhaust pipe, a mounting section, a rib, and a straightening element. The intake part takes air into the body. The mounting section mounts an air flow meter to the exhaust pipe to exhaust the air from the body. The rib is disposed on an inner surface of the body and extends toward the exhaust pipe. The straightening element is disposed on an inner surface of the exhaust pipe and extends in a same direction where the rib extends. The straightening element is located closer to the body than the mounting section.

DETAILED DESCRIPTION

To begin with, examples of relevant techniques will be described.

An air cleaner has a rib to ensure rigidity. A pressure loss is reduced or suppressed by optimizing a shape of the rib.

However, when air in the air cleaner flows along the rib, eddies are generated at a downstream end of the rib in a flow of the air and disturbs the flow. When the disturbed flow flows into an air flow meter, the air flow rate may not be measured accurately.

An air clearer in which a flow of air is less affected by a rib is provided in this disclosure, and can be achieved in embodiments described below.

According to an aspect of the present disclosure, an air cleaner is provided. The air cleaner has a body, an intake part, an exhaust pipe, a mounting section, a rib, and a straightening element. The intake part takes air into the body. The mounting section mounts an air flow meter to the exhaust pipe to exhaust the air from the body. The rib is disposed on an inner surface of the body and extends toward the exhaust pipe. The straightening element is disposed on an inner surface of the exhaust pipe and extends in a same direction where the rib extends. The straightening element is located closer to the body than the mounting section.

Such air cleaner has the straightening element on the inner surface of the exhaust pipe to face the rib on the inner surface of the body. The straightening element is located closer to the body than the mounting section. The straightening element can reduce the disturbed flow generated at a downstream end of the rib in the flow of the air.

First Embodiment

Figure 1:
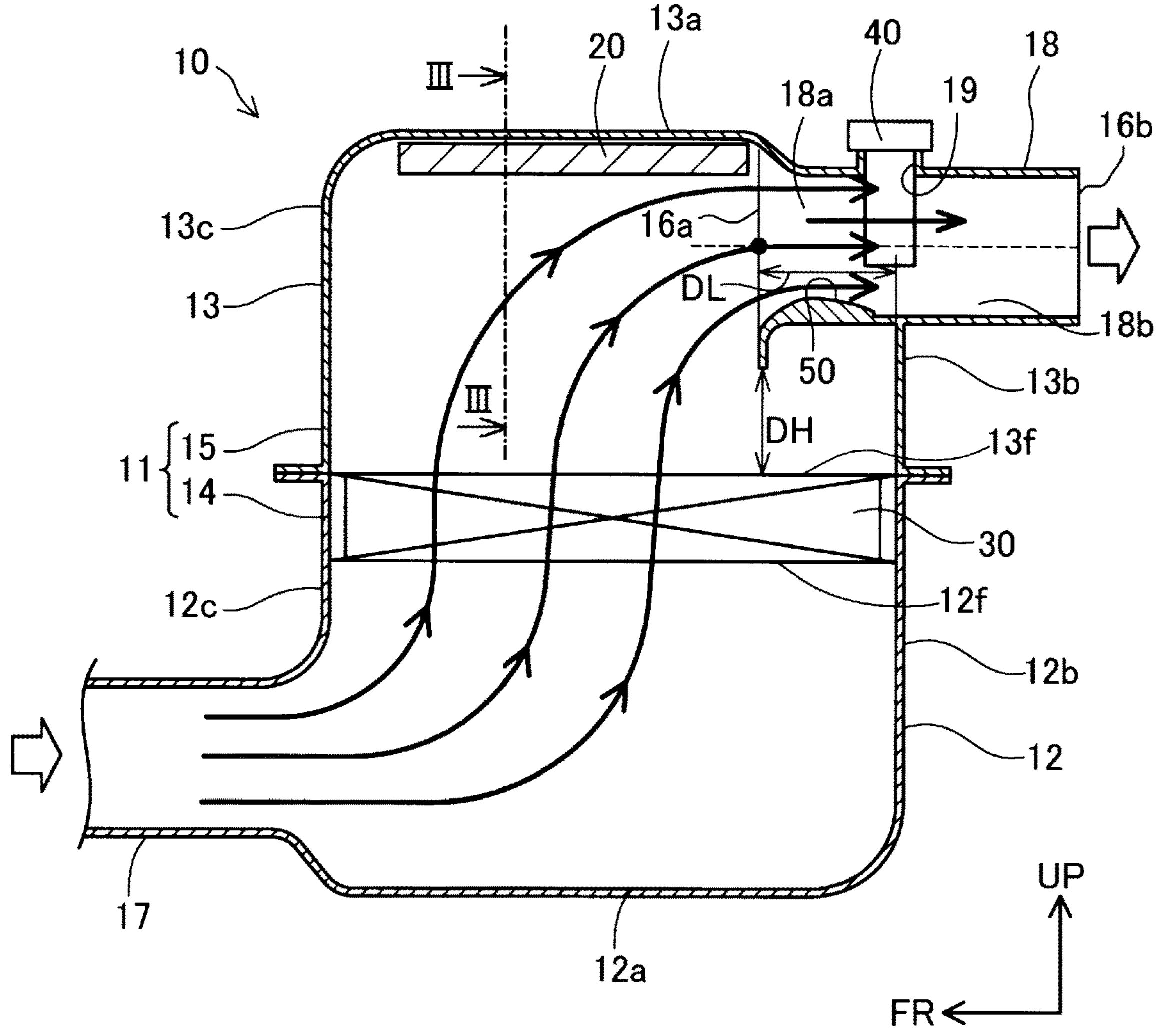
FIG. 1 is a cross section of an air cleaner in accordance with the first embodiment and illustrates a flow of air in the air cleaner.

As shown in FIG. 1, an air cleaner 10 in accordance with the first embodiment has a body 11, an intake part 17, and an exhaust pipe 18.

The body 11 has a hollow boxed shape. The body 11 has an air cleaner case 12 disposed adjacent to the intake part 17 where air is taken into and an air cleaner cap 13 disposed adjacent to the exhaust pipe 18 where the air is exhausted. The air cleaner case 12 has a rectangular plane surface 12*a* and four side surfaces 12*b*, 12*c*, 12*d*, and 12*e*. The side surfaces 12*b*, 12*c*, 12*d*, and 12*e* are connected to four ends of the plane surface 12*a* respectively. The air cleaner case 12 also has a rectangular opening 12*f* defined by the four side surfaces 12*b*, 12*c*, 12*d*, and 12*e*. The intake part 17 is formed on the side surface 12*c* of the four side surfaces 12*b*, 12*c*, 12*d*, and 12*e* and takes air into the body 11. The air cleaner case 12 is connected to the air cleaner cap 13 through the opening 12*f*.

The air cleaner cap 13 has a rectangular plane surface 13*a* and four side surfaces 13*b*, 13*c*, 13*d*, and 13*e*. The four side surfaces 13*b*, 13*c*, 13*d*, and 13*e* are connected to four ends of the plane surface 13*a* respectively. The air cleaner cap 13 also has a rectangular opening 13*f* defined by the four side surfaces 13*b*, 13*c*, 13*d*, and 13*e*. The exhaust pipe 18 is formed on the side surface 13*b* of the four side surfaces 13*b*, 13*c*, 13*d*, and 13*e* and exhausts the taken air outside from the body 11. The air cleaner cap 13 is connected to the air cleaner case 12 through the opening 13*f*. The plane surface 13*a* of the air cleaner cap 13 has plural ribs 20 for reinforcement and the ribs 20 extends toward the exhaust pipe 18.

The intake part 17 has a tubular shape whose cross section is a circle and protrudes outward from the body 11. The exhaust pipe 18 has a tubular shape whose cross section is a circle and protrudes outward from the body 11 in a direction opposite to where the intake part 17 protrudes. The exhaust pipe 18 may protrude in other directions. The exhaust pipe 18 has a first section 18*a* disposed inside the air cleaner cap 13 and a second section 18*b* disposed outside the air cleaner cap 13. The exhaust pipe 18 has an introduction opening 16*a* at an upstream end in a flow of the air and an exhaust opening 16*b* at a downstream end in the flow of the air. The exhaust opening 16*b* communicates with an engine combustion chamber through a pipe. The exhaust pipe 18 has a mounting section 19 on the same side with the plane surface 13*a* of the air cleaner cap 13. The air flow meter 40 is to be mounted on the mounting section 19.

The ribs 20 protrude from the plane surface 13*a* of the air cleaner cap 13 and extend from the side surface 13*c* toward the exhaust pipe 18. A downstream end of each rib 20 in the flow of the air, or an end located closer to the exhaust pipe 18, extends closer to the first section 18*a* of the exhaust pipe 18. The number of the ribs 20 is three in this embodiment, but may be one, two or four.

The air flow meter 40 is mounted attachable to and detachable from the mounting section 19 by a plug-in system. The air flow meter 40 measures an air flow rate supplied to the engine combustion chamber. An air introduction part of the air flow meter 40 is positioned at a center of the exhaust pipe 18 in a cross section view.

The straightening element 50 is disposed in the first section 18*a* of the exhaust pipe 18 to face the mounting section 19. The straightening element 50 extends in the same direction where the rib 20 extends. To say, the straightening element 50 is formed on an inner surface of the first section 18*a* and obliquely faces the rib 20 on the downstream side from the rib 20. That the straightening element 50 faces the rib 20 means that the straightening element 50 is located at a part of the exhaust pipe 18 where a perpendicular line from the rib 20 crosses. In this disclosure, the rib 20 does not face the straightening element 50 in a protruding direction of the rib 20, but may face the straightening element 50 in the protruding direction of the rib 20. A position to face the rib 20 in this disclosure includes a position distanced from the rib 20 in an extending direction of the rib 20 toward the exhaust opening 16*b* of the exhaust pipe 18, or includes a position obliquely facing the rib 20 on the downstream side from the rib 20. The straightening element 50 has a stream line shape, and protrudes from the inner surface of the exhaust pipe 18. The width of the straightening element 50 orthogonal to the flow of the air gets smaller toward the exhaust opening 16*b* of the exhaust pipe 18 in a plan view, or toward the downstream of the flow of the air.

Figure 2:
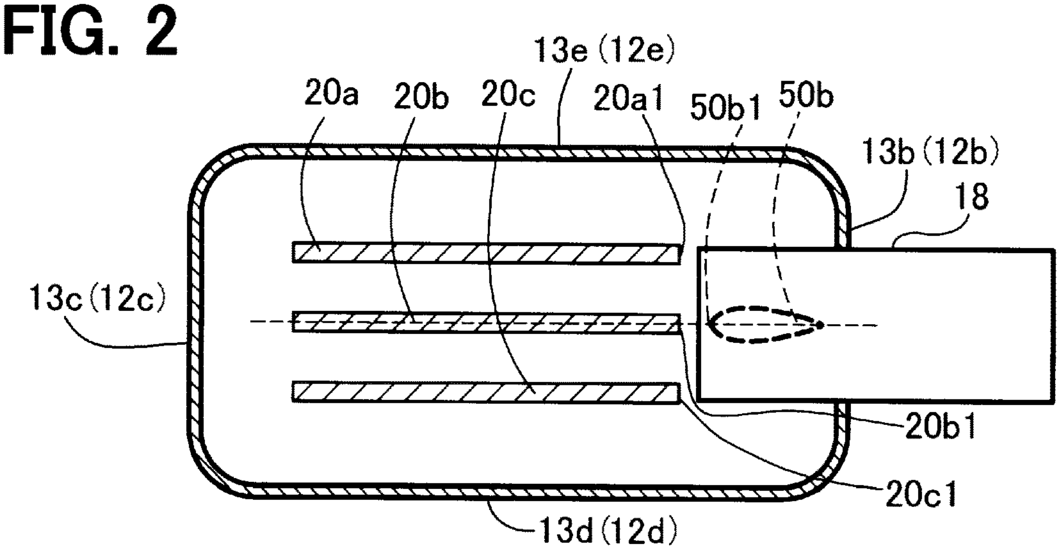
FIG. 2 is a view illustrating a positional relationship between a rib and a straightening element.

The straightening element 50 is substantially parallel with the extending direction of the rib 20. The plural ribs 20 include a rib 20*a*, rib 20*b*, and a rib 20*c* that are distanced each other in a width direction perpendicular to the extending direction and the protruding direction of the rib 20, and arranged in order from the side surface 13*d* to the side surface 13*e*. The rib 20*a* is an outermost rib closer to the side surface 13*e* and the rib 20*c* is an outermost rib closer to the side surface 13*d*. The straightening element 50 is located between the rib 20*a* and the rib 20*c* in the width direction of the ribs 20, or an orthogonal direction to the flow of the air. The straightening element 50 is disposed so that a downstream end 20*b*1 of the rib 20*b* is located closer to an upstream end 50*b*1 of the straightening element 50 in the flow of the air. It is preferred that the downstream end 20*b*1 of the rib 20*b*, which is one of the ribs 20, corresponds to the upstream end 50*b*1 of the straightening element 50 in the extending direction of the rib 20*b*. In other words, as shown in FIG. 2, the downstream end 20*b*1 of the rib 20*b* is located at the same position as the upstream end 50*b*1 of the straightening element 50 in the width direction perpendicular to the extending direction and the protruding direction of the rib 20. In this case, large straightening effect is obtained.

A filter element 30 is disposed in the body 11 and separates the body 11 into a dust side 14 and a clean side 15 in a thickness direction UP of the filter element 30. The thickness direction UP may correspond to an upward direction when the air cleaner 10 is mounted on a vehicle. A direction FR in FIG. 1 may correspond to a frontward direction when the air cleaner 10 is mounted on a vehicle. The filter element 30 is an air filter to capture a foreign substance in the taken air introduced to the dust side 14 of the air cleaner case 12 from the intake part 17.

Figure 3:
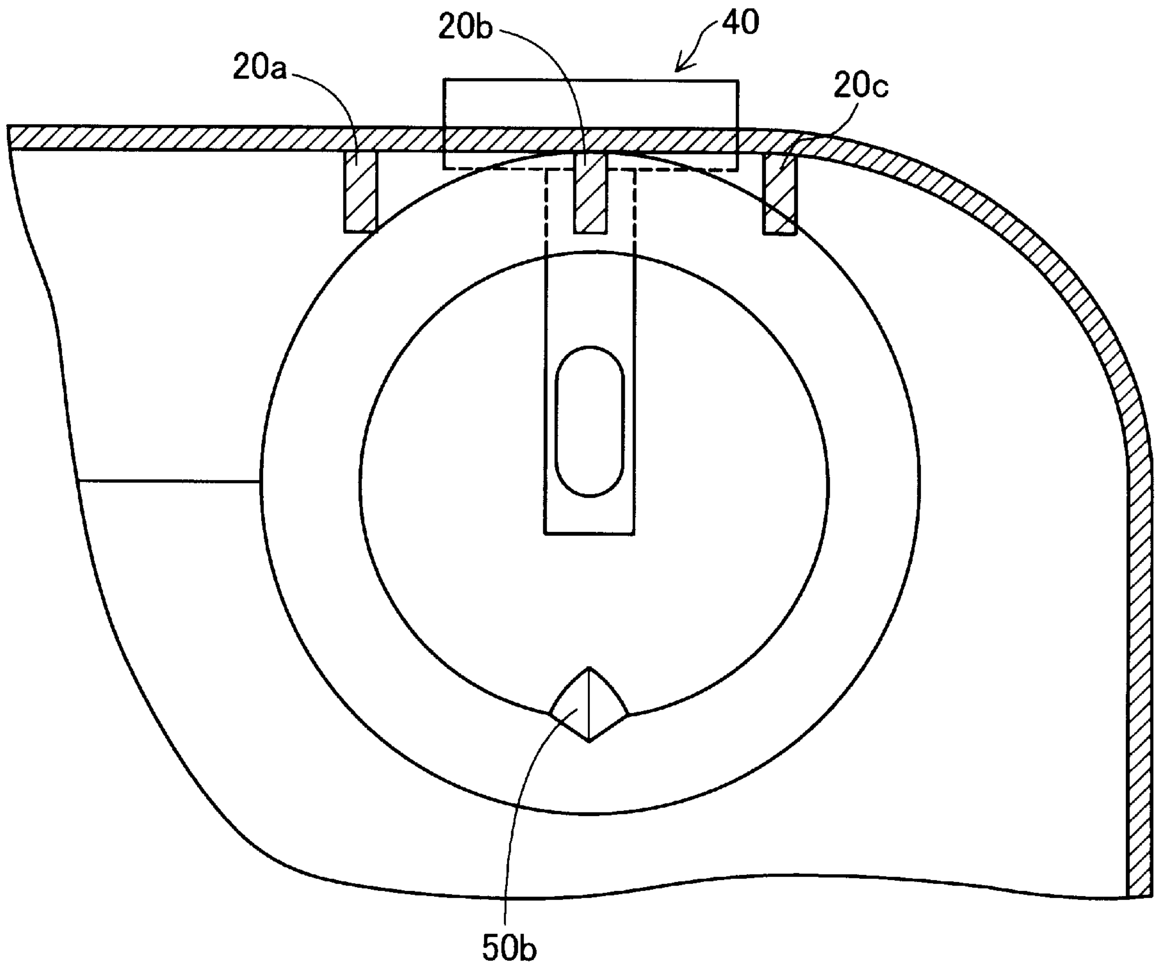
FIG. 3 is a cross section of the air cleaner taken along the line III-III in FIG. 1.

The flow of the air in the air cleaner 10 is explained in FIGS. 1 to 3. The taken air from the intake part 17 flows into the air cleaner case 12 and passes through the filter element 30 in the thickness direction UP.

The air having passed through the filter element 30 is introduced to the air cleaner cap 13. A part of the air introduced to the air cleaner cap 13 hits on the plane surface 13*a* and is straightened to the exhaust pipe 18 by the ribs 20. An eddy and a disturbance are generated at the downstream end of the ribs 20 in the flow of the air along the ribs 20. The eddy and the disturbance generated at the downstream end of the ribs 20 are reduced or eliminated by the straightening element 50. Thus, the flow of the air reaches a detecting part of the air flow meter 40 in the exhaust pipe 18 after the eddy and the disturbance are reduced or eliminated. The air introduced to the exhaust pipe 18 is exhausted outside the air cleaner 10 from the air exhaust opening 16*b*.

The air cleaner 10 in this embodiment has the straightening element 50 extending in the same direction where the rib 20 extends, which can reduce or eliminate the eddy and the disturbance generated at the downstream end of the rib 20 in the flow of the air. This further eliminates the deterioration of the measurement accuracy of the air flow rate by the air flow meter 40 and improves the measurement accuracy of the air flow rate. The deterioration is caused by the disturbed flow of the air. The air introduction part of the air flow meter 40 is positioned at the center of the exhaust pipe 18 in the cross section view. When another straightening element 50 is disposed to face the straightening element 50 in this embodiment, on the same surface with the rib 20, the measurement accuracy of the air flow rate may be improved.

Second Embodiment

Figure 4:
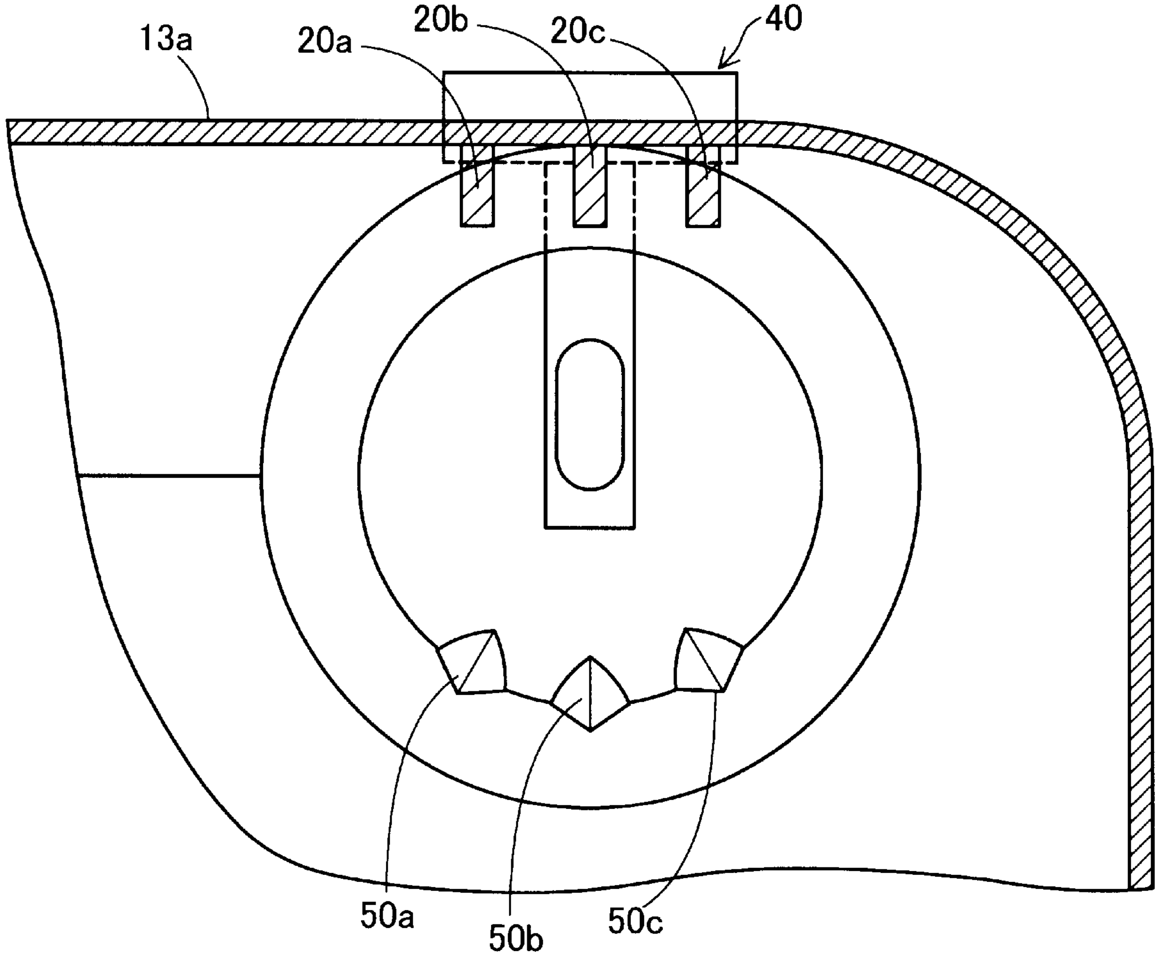
FIG. 4 is a view illustrating an air cleaner in accordance with the second embodiment.

As shown in FIG. 4, an air cleaner 10 in the second embodiment is different from the air cleaner 10 in the first embodiment at the point of having straightening elements 50*a*, 50*b*, and 50*c* corresponding to the ribs 20*a*, 20*b*, and 20*c* respectively. The ribs 20*a*, 20*b*, and 20*c* are located on the plane surface 13*a* of the air cleaner cap 13. Other structure is the same with the first embodiment, the same symbols in the first embodiment are added and not explained in this embodiment.

The straightening elements 50*a*, 50*b*, and 50*c* are formed on the inner surface of the first section 18*a* on the downstream side from the ribs 20*a*, 20*b*, and 20*c*. The straightening elements 50*a*, 50*b*, and 50*c* obliquely face the ribs 20*a*, 20*b*, and 20*c* respectively. The straightening elements 50*a*, 50*b*, and 50*c* are arranged in the same line with axes of the rib 20*a*, 20*b*, and 20*c* respectively in a plane view.

According to the air cleaner 10 in the second embodiment, the three straightening elements 50*a*, 50*b*, and 50*c* disposed to correspond respectively to the three ribs 20*a*, 20*b*, and 20*c* can reduce or eliminate the eddy and the disturbance of the flow generated at the downstream end of the ribs 20*a*, 20*b*, and 20*c*. Thus, the disturbance of the flow is reduced or eliminated more efficiently in this embodiment than in the first embodiment and improves the measurement accuracy of the air flow rate.

Third Embodiment

Figure 5:
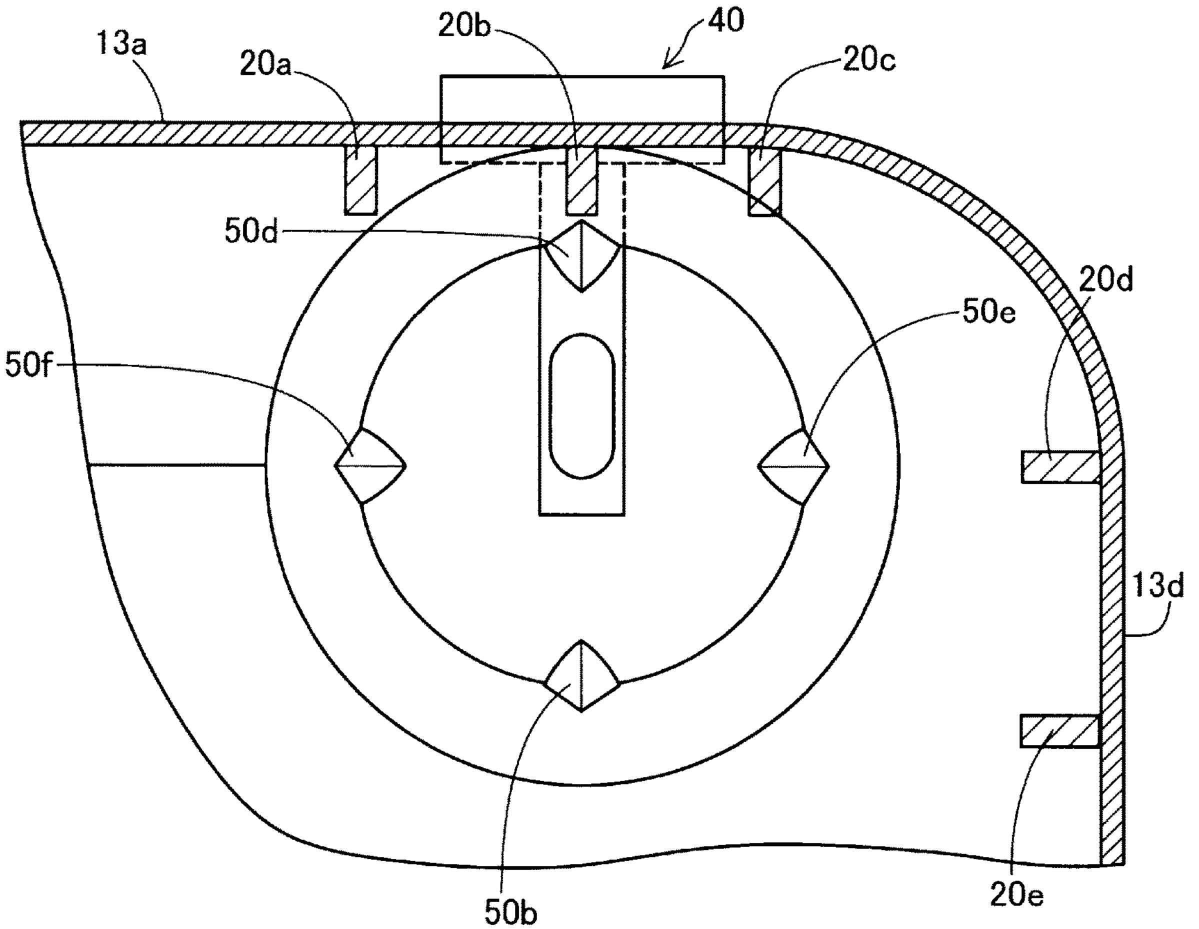
FIG. 5 is a view illustrating an air cleaner in accordance with the third embodiment.

As shown in FIG. 5, an air cleaner 10 in the third embodiment is different from the first embodiment and the second embodiment at the point of having the straightening elements 50*f*, 50*d*, 50*b*, and 50*e* and ribs 20*d* and 20*e*. The ribs 20*d* and 20*e* are located on the side surface 13*d* of the air cleaner cap 13. The straightening elements 50*f*, 50*d*, 50*b*, and 50*e* are disposed on a curved surface of the exhaust pipe 18 and distanced each other by 90 degrees. As shown in FIG. 5, the straightening elements 50*f* and 50*e* are positioned to correspond to the rib 20*d*, and the straightening element 50*b* is positioned to correspond to the rib 20*e*.

The straightening element 50*b* of the four straightening elements 50*b*, 50*d*, 50*e*, and 50*f* in the third embodiment is disposed to face the rib 20*b* on the plane surface 13*a* of the air cleaner cap 13 similarly in the first embodiment. The straightening element 50*d* is disposed to face the straightening element 50*b*, which means the straightening element 50*d* is on the same surface with the rib 20*b* that is located on the plane surface 13*a* of the air cleaner cap 13. The straightening element 50*e* is distanced from the straightening element 50*d* by 90 degrees to the side surface 13*d* relative to a center axis of the exhaust pipe 18 along the curved surface of the exhaust pipe 18. The straightening element 50*f* is disposed to face the straightening element 50*e*. The straightening elements 50*b*, 50*f*, 50*d*, and 50*e* are arranged in order and distanced each other by 90 degrees in clockwise along the curved surface of the exhaust pipe 18 in FIG. 5.

The air cleaner 10 in the third embodiment has the straightening element 50*d* on the curved surface of the first section 18*a* of the exhaust pipe 18 where the mounting section 19 is located, or on the same surface with the rib 20*b*. The straightening element 50*d* that is adjacent closely to the downstream end 20*b*1 of the rib 20*b* efficiently reduces or eliminates the eddy and the disturbance of the flow generated at the downstream end 20*b*1 of the rib 20*b*. The other straightening elements 50*e*, 50*c*, and 50*f* support to straighten entire flow of the air to improve the measurement accuracy of the air flow rate.

Other Embodiment

The rib 20 of the air cleaner 10 may be located within a width of the exhaust pipe 18 in a plane view. The width of the exhaust pipe 18 is orthogonal to the flowing direction of the air. The straightening element 50 is located within the width of the exhaust pipe 18. Such positional relationship of the rib 20 and the straightening element 50 can efficiently reduce the disturbance of the flow of the air generated at the rib 20.

The air cleaner 10 may have three straightening elements 50 on the curved surface of the first section 18*a* on the same side with the ribs 20*a*, 20*b*, and 20*c* of the air cleaner 10 in the first to the third embodiment. The straightening element 50 adjacent closely to the rib 20 can reduce the disturbance of the flow of the air the most efficiently. The three straightening elements 50 make greater straightening effect while the only one straightening element 50 has the straightening effect. This improves the measurement accuracy of the air flow rate.

The disturbance of the flow of the air differs according to the structure of the air cleaner 10. As shown in FIG. 1, a distance DL is defined as a distance between the side surface 13*b* that is an inner surface of the body 11 and where the exhaust pipe 18 is formed, and an upstream end of the exhaust pipe 18 in the flow of the air. A center of the upstream end of the exhaust pipe 18 is a center of the introduction opening 16*a* that introduces the air from the clean side 15, or a center of an opening part. The distance DL is a distance between the inner surface of the body 11 and the center of the introduction opening 16*a* in the extending direction of the rib 20. A distance DH is defined as a distance between the filter element 30 and the upstream end of the exhaust pipe 18 in the protruding direction of the rib 20. More specifically, the distance DH is a distance between a downstream surface of the filter element 30 in the flow of the air and the upstream end of the exhaust pipe 18 that is located the closest to the filter element 30. When the distance DL and the distance DH satisfy a relationship of $(DL^2/DH) \geq 400$, the disturbance of the flow of the air reaches the air flow meter 40. When the structure of the air cleaner 10 satisfies the relationship described above, the air flow is more likely to be disturbed. In this case, straightening the flow of the air gives great effect and improves the measurement accuracy of the air flow rate. Thus, a ratio of the distances DL and DH are suitably set for the air cleaner 10. It is preferred that the air cleaner 10 satisfies the relationship.

The air cleaner 10 may have the exhaust pipe 18 disposed entirely outside the cleaner cap 13. This lengthens a distance from the downstream end 20*b*1 of the rib 20*b* to the air flow meter 40 and extends a space for the straightening element 50 to be disposed on the same surface with the rib 20*b*. This lengthens a distance for a flow of the air from hitting the rib 20 to reaching the air flow meter 40, but this also allows disposing the plural straightening elements 50 in straight line just before the air flow meter 40 in the extended space. The straightening elements 50 are arranged in the direction where air flows. Such air cleaner 10 generates greater straightening effect with the rib 20 and the straightening element 50 and improves the measurement accuracy of the air flow rate.

The present disclosure is not limited to the embodiments described above and may have various modifications without departing from the gist of the present disclosure. For example, technical features in embodiments corresponding to the technical features in each of the embodiments described in the detailed description may be replaced or combined appropriately to solve a part or all of the issues described above or to achieve a part or all of the effects described above. The technical features may be deleted unless the technical features are explained essential in the description.

What is claimed is:

1. An air cleaner comprising:
- a body;
- an intake part configured to take air into the body;
- an exhaust pipe configured to exhaust the air from the body;
- a mounting section configured to mount an air flow meter to the exhaust pipe;
- a rib disposed on an inner surface of the body and extending toward the exhaust pipe; and
- a straightening element disposed on an inner surface of the exhaust pipe and extending in a same direction where the rib extends, the straightening element being located closer to the body than the mounting section, wherein
- the rib is one of a plurality of ribs, and has a downstream end located adjacent to an upstream end of the straightening element, and
- the straightening element is located between two outermost ribs of the plurality of ribs.

2. The air cleaner according to claim 1, wherein
- the straightening element is formed in the exhaust pipe to face the rib.

3. The air cleaner according to claim 1, wherein
- the straightening element is located in the exhaust pipe on a same side where the rib is located.

4. The air cleaner according to claim 1, further comprising:
- a filter element disposed in the body, wherein
- the body has a wall where the exhaust pipe is located, a distance between an inner surface of the wall of the body and an upstream end of the exhaust pipe in a flow of the air is defined as a distance DL, a distance between the filter element and the upstream end of the exhaust pipe is defined as a distance DH, and the distance DL and the distance DH satisfy a relationship of $(DL^2/DH) \geq 400$.

5. The air cleaner according to claim 1, wherein the plurality of ribs is disposed parallel to each other and extends toward the exhaust pipe to straighten the air to the exhaust pipe.

6. The air cleaner according to claim 1, wherein the straightening element is disposed parallel to the plurality of ribs to reduce or eliminate an eddy and a disturbance generated at the downstream end of the plurality of ribs, and a width of the straightening element orthogonal to a flow of air gets smaller toward an exhaust opening of the exhaust pipe in a plan view.

7. An air cleaner comprising:

a body;

an intake part configured to take air into the body;

an exhaust pipe configured to exhaust the air from the body;

a mounting section configured to mount an air flow meter to the exhaust pipe;

a rib disposed on an inner surface of the body and extending toward the exhaust pipe;

a straightening element disposed on an inner surface of the exhaust pipe and extending in a same direction where the rib extends, the straightening element being located closer to the body than the mounting section; and a filter element disposed in the body, wherein the body has a wall where the exhaust pipe is located, a distance between an inner surface of the wall of the body and an upstream end of the exhaust pipe in a flow of the air is defined as a distance DL, a distance between the filter element and the upstream end of the exhaust pipe is defined as a distance DH, and the distance DL and the distance DH satisfy a relationship of $(DL^2/DH) \geq 400$.

8. The air cleaner according to claim 7, wherein the straightening element is formed in the exhaust pipe to face the rib.

9. The air cleaner according to claim 7, wherein the straightening element is located in the exhaust pipe on a same side where the rib is located.

10. The air cleaner according to claim 1, the air cleaner further comprising:

two additional straightening elements respectively arranged in line with axes of the two outermost ribs in a plane view.

* * * * *